United States Patent Office.

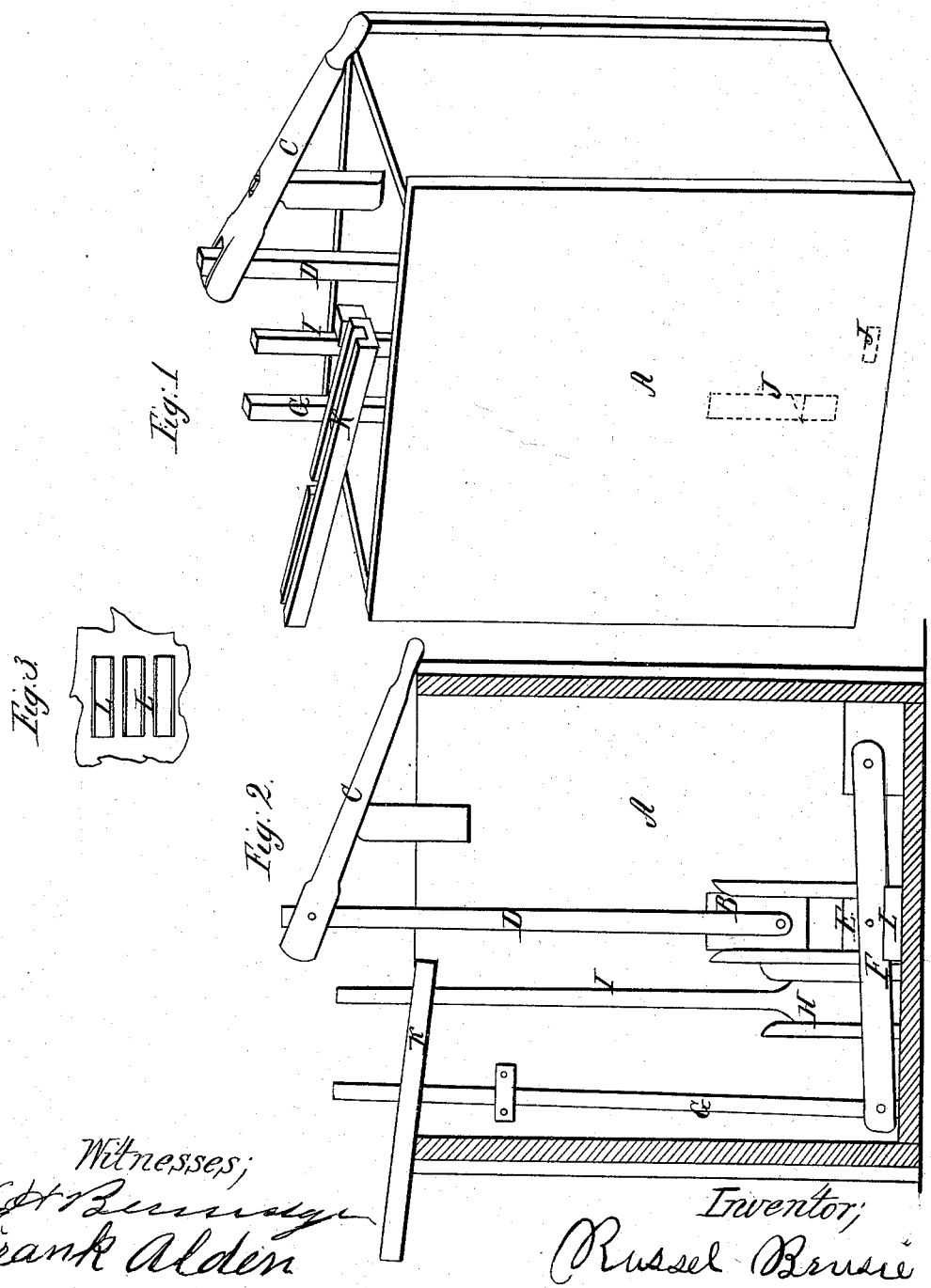

RUSSEL BRUSIE, OF CLEVELAND, OHIO.

Letters Patent No. 66,211, dated July 2, 1867.

IMPROVEMENT IN APPARATUS FOR GATHERING APPLE SEEDS.

*The Schedule referred to in these Letters Patent and making part of the same.*

TO ALL WHOM IT MAY CONCERN:

Be it known that I, R. BRUSIE, of Cleveland, in the county of Cuyahoga, and State of Ohio, have invented certain new and useful Improvements in an Apparatus for Gathering Apple Seeds; and I do hereby declare that the following is a full and complete description of the construction and operation of the same, reference being had to the accompanying drawings, making a part of this specification, in which—

Figure 1 is a perspective view of the apparatus.
Figure 2 is a longitudinal section.
Figure 3 is a detached section to be referred to.

Like letters of reference refer to like parts in the views.

This apparatus consists of a wooden box or tank, A, fig. 1, the depth of which being some three or four feet, and the length and breadth according to the capacity of the apparatus, or as convenience may determine. B, fig. 2, is a gate operated by the lever C, to which it is connected by the link D. This gate, it will be seen, does not open down to the bottom of the box, but the opening is above, some eight or ten inches, more or less. E is also a gate, connected to the lever F, and which is operated by the link G. The purpose of this gate will hereafter be shown. H is also a gate, constructed as gate B. This gate, unlike B, opens down close to the bottom of the box, and is operated by the link or handle I. The relative distance of the gates from the bottom of the box, and the respective size of the same, are indicated by the dotted lines J, fig. 1, the openings being on the opposite side from that shown in the drawing. K is a chute or spout; L, a number of projecting edges or blades of sheet iron or tin, a detached view of which is given in fig. 3.

The practical operation of this machine is as follows: A certain quantity of apple pomace, according to the capacity of the apparatus, is thrown into the box, which is then treated with water conveyed into the same through the spout referred to. As the water falls upon the bottom it strikes upon the projecting blades of iron; the force of the water upon the pomace drives it down upon these blades, which cut and divide it up, and thereby liberating the seed contained in the compressed material. The pomace being light floats upon the water, while the seed sinks to the bottom, and which by the peculiar action of the water, caused by the falling stream, is carried back from the blades and away from the gates through which the surplus water is allowed to escape, together with the pomace, after being sufficiently subjected to the above treatment. When some two or three bushels of pomace have been thus treated it is then drawn off through the gate B, which, being the largest and distant from the bottom, is easily done without in the least disturbing the deposited seed. When the pomace has all been removed the balance of the water is drawn off through the gate H, which, as above said, opens close to the bottom. The apple seeds can now be taken out, which will be found deposited in the corners and along the back part of the box, and the operation again repeated as before. The gate E referred to is for the purpose of partially closing the opening so that a larger quantity of water may be retained in the box, and by which the depth and quantity may be graduated according to the amount of pomace treated at once.

What I claim as my improvement, and desire to secure by Letters Patent, is—

The construction of a box, A, provided with the gates B, H, and E, in combination with the blades L, substantially as and for the purpose described.

RUSSEL BRUSIE.

Witnesses:
   W. H. BURRIDGE.
   J. HOLMES.